United States Patent [19]

Verdegaal et al.

[11] 4,310,343

[45] Jan. 12, 1982

[54] PROCESS FOR MAKING LIQUID FERTILIZER

[75] Inventors: William J. Verdegaal; George F. Verdegaal, both of Hanford, Calif.

[73] Assignee: Verdegaal Bros. Fertilizer, Hanford, Calif.

[21] Appl. No.: 97,681

[22] Filed: Nov. 27, 1979

[51] Int. Cl.³ .............................................. C05C 9/00
[52] U.S. Cl. .......................................... 71/28; 564/63
[58] Field of Search ............................ 71/28, 29, 30; 260/555 S, 96.5 R, 96.5 C; 564/63

[56] References Cited

U.S. PATENT DOCUMENTS

| | | | |
|---|---|---|---|
| 3,100,698 | 8/1963 | Horsley et al. | 71/28 |
| 3,114,624 | 12/1963 | Smith et al. | 71/63 X |
| 3,313,613 | 4/1967 | Green | 71/28 |
| 3,333,939 | 8/1967 | Davis et al. | 71/29 |
| 3,464,809 | 9/1969 | Hicks | 71/61 |
| 3,529,951 | 9/1970 | Every et al. | 71/28 |
| 3,700,460 | 10/1972 | Bichsel et al. | 426/271 |
| 3,725,029 | 11/1973 | Blackmore | 71/28 |
| 3,785,796 | 1/1974 | Mann, Jr. | 71/28 |
| 3,928,015 | 12/1975 | Siegel et al. | 71/28 |
| 3,984,226 | 10/1976 | Garthus et al. | 71/63 X |
| 4,073,633 | 4/1976 | Young | 71/28 |
| 4,081,264 | 3/1976 | Ali | 71/28 |
| 4,082,533 | 4/1976 | Wittenbrook et al. | 71/28 |
| 4,089,670 | 5/1976 | Funk | 71/29 |
| 4,116,664 | 9/1978 | Jones | 260/555 S X |

FOREIGN PATENT DOCUMENTS 202963   4/1920   Canada .

OTHER PUBLICATIONS

Dalman, "Ternary Systems of Urea and Acids," *J. Amer. Chem. Soc.*, vol. 56, pp. 549–553 (1934).
"Adding Plant Nutrient Sulphur to Fertilizer," *The Sulphur Institute Tech. Bull.*, No. 10 (1964).
Molodkin, et al., "Compounds of Urea with Acids," *Russ. J. Organic Chem.*, vol. 12, pp. 499–504 (1967).

*Primary Examiner*—Arnold Turk

[57] ABSTRACT

A new improved process for making liquid fertilizer having a high nitrogen and sulfur content has been developed in which urea and sulfuric acid are mixed. Exothermic heat, which normally builds up in successive reactions is dissipated via use of a non-reactive, nutritive heat sink, preferably comprising a predetermined amount of previously produced fertilizer.

5 Claims, No Drawings

PROCESS FOR MAKING LIQUID FERTILIZER

BACKGROUND OF THE INVENTION

1. Field of Invention

This invention relates to the methods of making liquid nitrogen-sulfur fertilizers for direct application to the soil. Liquid fertilizer has come into wide-spread usage in locations where irrigation rather than rainfall is predominantly used to irrigate crops, such as California. Liquids are readily introduced into the irrigation systems and do not clog pipes or valves. With the relatively recent advent of drip irrigation, the problem of clogging small diameter openings is severe.

The reaction between urea and concentrated sulfuric acid is categorized as follows:

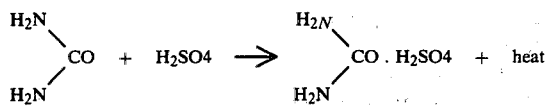

The reaction is strongly exothermic and explosion may result if concentrated sulfuric acid is used without dissipating the heat. The resulting end product is a liquid which remains in the fluid state at most temperatures. This liquid fertilizer is ideally suited to the relatively new methods of drip irrigation.

2. Brief Description of the Prior Art

Previous patents teach methods of making liquid fertilizer, for example, Jones, U.S. Pat. No. 4,116,664, describes a sequential method of slowly adding sulfuric acid to powdered or prilled urea in order to control the resulting heat of the exothermic reaction. by blending in small amounts over a tortuous path through a multistage reactor, a liquid nitrogen -sulfur fertilizer is gradually produced. The slowness of this method is commercially impractical for producing large amounts of liquid fertilizer. Moreover, the capital investment for the reactor is substantial in relation to the volume of fertilizer produced.

Garthus, et al. U.S. Pat. No. 3,984,226 relates to a process wherein sulfuric acid reacts with ammonia gas to form a liquid. The considerable amount of equipment, i.e., holding tanks, absorbers, etc., used under this process requires substantial capital outlays. Neither of these processes of the prior art teaches the making of a liquid fertilizer by mixing urea and sulfuric acid in a quick, simple and economic batch process in which the heat of the reaction is effectively controlled.

The reaction of urea and sulfuric acid is so highly exothermic as to present a danger of explosion. Consequently, the prior processes either: (1) greatly diluted the ingredients to make a fertilizer of very low nutrient levels for the quantities packaged and shipped; or (2) very slowly prepared a concentrated fertilizer to avoid explosion. Both of these alternatives are uneconomical.

SUMMARY AND OBJECTS OF THE INVENTION

The present invention provides a quick, simple, economical method for producing a concentrated liquid nitrogen sulfur fertilizer by dissipating the heat of reaction in a heat sink. The heat sink may conveniently be any nutritive component that absorbs sufficient heat of reaction to eliminate the risk of explosive reaction. In a preferred embodiment, the heat sink may be the already reacted liquid fertilizer. Thus, by leaving a "heel" of about 10% of the fertilizer from the previous batch in the mixing tank, the heat is dissipated as the reaction takes place in the tank, which also acts as a reaction vessel.

This method thus overcomes the explosive heat of the prior art. It also does this without the need for any complex processing machinery.

It is an object of this invention to provide an improved method of making a concentrated liquid nitrogensulfur fertilizer.

It is a further object to rapidly mix concentrated sulfuric acid with urea without explosion.

DESCRIPTION OF THE PREFERRED EMBODIMENTS

In the preferred embodiment, a conventional mixing tank is provided, having a suitable agitator for thorough mixing and reaction. A suitable size is 6500 gallons. Means for removing the final liquid product froom the tank is included, such as a tap at the bottom of the tank. Inlet means, such as a three inch pipe which, for example, has a flow rate of 1,500 lbs./minute, may be used to introduce liquids to the tank. Because concentrated sulfuric acid is used, all hardware should be made of 316 stainless steel or its equivalent.

In order to minimize the amount of fertilizer to be transported, the highest values of N and S in the final product is desired. Another goal is to have the fertilizer in liquid form for ease of application. Given these competing considerations, a commercially practicable upper limit on these values is about 28 units nitrogen and about 9 units sulfur. If the fertilizer has nitrogen content below 26 parts or a sulfur content below 4 parts, it is not as commercially desirable as the above recited levels. While lower concentrations are produceable and utilizable, the optimum levels for readily transportable, highly concentrated, liquid nitrogen-sulfur fertilizer fall in the range of 26-0-0-4 to 30-0-0-10. While urea is about 46% nitrogen, it is in solid form. Maximum concentration of these two nutrients is obtained by reacting the solid urea with concentrated sulfuric acid and a minimum of water as diluent.

A fertilizer with a 28-0-0-9 composition has 28 parts nitrogen, no phosphorous or potassium, and 9 parts sulfur. This fertilizer is made according to the present invention by combining a greater than stoichiometric amount of urea, having high N value, with concentrated sulfuric acid. This combination is explosive if the acid is added at 1,500 lbs./minute. The urea should be at least 50% of the end product and sulfuric acid should be at least 10%.

The process of this invention involves placing a heat sink into the mixing tank. In order to provide the highest values of nutrients in the fertilizer, the heat sink should add to the nutritive properties of the fertilizer and not merely dilute it. The heat sink must be capable of absorbing a large quantity of quickly evolving heat from the reaction.

In the preferred embodiment, between 5 and 20% of the weight of the end product is a heat sink made of a previously produced batch of liquid fertilizer having the same proportions of starting products as the desired fertilizer. If a 28-0-0-9 fertilizer is desired, then the following amounts of ingredients are further added: 61% urea, 30% H$_2$SO$_4$ and the balance, water.

The calculation is as follows. Urea, providing the N component, is 46% nitrogen. To give a final value of N.

of 28, then (28/.46)=61% urea must be included in the reaction (apart from the nutritive heat sink). Similarly, to give a fertilizer with 9% sulfur, using sulfuric acid at 93% concentration (about 30% sulfur), then (9/.30)=30% sulfuric acid in the reaction. The remaining 9% of the mixture apart from the heat sink is conveniently water. More water may be added, of course, but the nutrient values of the end product are correspondingly reduced. For commercial purposes, I prefer not to exceed 15% water in the end product.

While higher concentrations of sulfuric acid are available, e.g. 98%, I prefer 93% concentration for the optimum balance of economy and effectiveness. While lower concentrations of sulfuric acid may also be used (e.g. 60%) the resulting product is more diluted, and does not achieve the particularly high concentrations of nutrients in a liquid fertilizer as does the 28-0-0-9 formula.

The heat sink of the reacted fertilizer from a previous batch, as in the preferred embodiment, does not dilute the concentration, yet it absorbs sufficient heat of reaction to avoid the risk of explosion. Where the previous batch of fertilizer is used as the heat sink, at least 5% of the weight of the end product is needed to provide reasonable assurance of safety from excessive heat or explosion. There is no theoretical upper end to the amount of heat sink retained in the mixing tank but beyond 20% of the weight of the new batch consisting of recycled fertilizer, the benefit is no greater so there is no need to recycle more than that.

The heat sink must be intimately mixed with the solid urea to prevent explosion. Using a heat sink of previously made liquid fertilizer and agitations, a slurry of urea, water and liquid fertilizer is prepared before adding the sulfuric acid. Care should be taken to avoid masses of solid urea because concentrated sulfuric acid is highly reactive with solid urea. The heat sink should thoroughly permeate the urea.

As a specific example, 10% of recycled fertilizer may be left in the container of the remaining 90% of the new batch to be made up of new ingredients, urea is added in an amount equal to about 55% by weight of the desired end product.

Then water is pumped into the mixing tank in an amount equal to about 8% by weight of the desired end product. Water helps to dissolve the urea.

Then 93% sulfuric acid is added in an amount equal to about 27% of the weight of the desired end product. The acid is added at a rate of about 100-500 gallons per minute, into the tank.

While the resulting fertilizer has only nitrogen and sulfur, other nutrients can readily be blended with the highly concentrated liquid. For example, potash, phosphoric acid, or zinc sulfate may be easily mixed with the present fertilizer to give a broaderr range of nutrients. An advantage of the fertilizer of the present process is its ability to be stored for long periods and under varying conditions. While there is a high N content, there is no free ammonia, a common source of instability with other liquid fertilizers.

Urea sulfate liquid fertilizer has been found to have a very low pH, e.g. 0.5 pH. Highly acidic fertilizers are very useful for treatment of alkaline soils, such as in California's Central Valley, where the soil pH ranges from approximately 7.5 to 9.5

The fertilizer produced by the process of this invention is easy to transpot and to apply to irrigation systems, including drip systems, as well as directly to the soil. It is highly concentrated to give the maximum nutrient values while maintaining a liquid formula. This desirable concentrated producct is achieved economically by absorbing the heat of reaction in a nutritive heat sink.

What is claimed is:

1. In a process for making a concentrated liquid fertilizer by reacting sulfuric acid and urea, to form an end product,, the improvement comprising:
   a. providing a non-reactive, nutritive heat sink, capable of dissipating the heat of urea and sulfuric acid; in an amount at least 5% of the end product.
   b. adding water to the heat sink in an amount not greater than 15% of the end product,
   c. adding urea to the mixture in an amount of at least 50% of the total weight of the end product.
   d. adding concentrated sulfuric acid in an amount equal to at least 10% of the total weight of the end product.

2. The process of claim 1 wherein the heat sink is recycled liquid fertilizer.

3. The process of claim 1 wherein sulfuric acid is added at the rate of 100-500 gallons per minute.

4. A batch process of making concentrated liquid fertilizer in which sulfuric acid and urea are mixed, the steps comprising:
   a. providing a heat sink of about 10% by weight of the total material of recycled fertilizer of comparable composition to the desired end product,
   b. adding water in an amount about 8% of the total weight of the end product,
   c. adding urea to the mixture in an amount about 55% of the total weight of the end product,
   d. adding approximately 93% sulfuric acid in an amount about 27% of the total weight of the end product.

5. The process of claim 5 wherein 93% sulfuric acid is added at the rate of at least 100 gallons per minute.

* * * * *

UNITED STATES PATENT AND TRADEMARK OFFICE
CERTIFICATE OF CORRECTION

PATENT NO. : 4,310,343
DATED : January 12, 1982
INVENTOR(S) : William J. Verdegaal, George F. Verdegaal It is certified that error appears in the above—identified patent and that said Letters Patent is hereby corrected as shown below:

Claim 5 is corrected to read as follows:

5. The process of claim 4 wherein 93% sulfuric acid is added at the rate of at least 100 gallons per minute.

Signed and Sealed this

Fifth Day of August 1986

[SEAL]

Attest:

DONALD J. QUIGG

Attesting Officer

Commissioner of Patents and Trademarks